United States Patent
Levi et al.

(10) Patent No.: US 12,511,161 B2
(45) Date of Patent: Dec. 30, 2025

(54) TIME-BASED SYNCHRONIZATION DESCRIPTORS

(71) Applicant: MELLANOX TECHNOLOGIES, LTD., Yokneam (IL)

(72) Inventors: Dotan David Levi, Kiryat Motzkin (IL); Daniel Marcovitch, Yokneam Illit (IL); Natan Manevich, Migdal HaEmek (IL); Wojciech Wasko, Pomeranian (PL); Igor Voks, Kfar Yehoshua (IL)

(73) Assignee: Mellanox Technologies, Ltd, Yokneam (IL)

( * ) Notice: Subject to any disclaimer, the term of this patent is extended or adjusted under 35 U.S.C. 154(b) by 621 days.

(21) Appl. No.: 17/667,600

(22) Filed: Feb. 9, 2022

(65) Prior Publication Data

US 2023/0251899 A1 Aug. 10, 2023

(51) Int. Cl.
*G06F 9/48* (2006.01)

(52) U.S. Cl.
CPC .................. *G06F 9/4887* (2013.01)

(58) Field of Classification Search
CPC .................................................. G06F 9/4887
See application file for complete search history.

(56) References Cited

U.S. PATENT DOCUMENTS

| | | |
|---|---|---|
| 6,212,197 B1 | 4/2001 | Christensen et al. |
| 6,381,283 B1 * | 4/2002 | Bhardwaj .............. H01R 24/64 375/257 |
| 6,564,267 B1 | 5/2003 | Lindsay |
| 6,816,492 B1 | 11/2004 | Turner et al. |
| 6,954,432 B1 | 10/2005 | Bychowsky et al. |
| 7,224,669 B2 | 5/2007 | Kagan et al. |
| 7,245,627 B2 | 7/2007 | Goldenberg et al. |
| 7,676,597 B2 | 3/2010 | Kagan et al. |
| 8,370,675 B2 | 2/2013 | Kagan |
| 8,879,552 B2 | 11/2014 | Zheng et al. |

(Continued)

FOREIGN PATENT DOCUMENTS

| | | |
|---|---|---|
| AU | 2012216611 B2 | 3/2013 |
| CN | 101517944 A | 8/2009 |

(Continued)

OTHER PUBLICATIONS

IEEE Standard 1588-2008, "IEEE Standard for a Precision Clock Synchronization Protocol for Networked Measurement and Control Systems", pp. 1-289, year 2008.

(Continued)

*Primary Examiner* — Wissam Rashid
(74) *Attorney, Agent, or Firm* — Meitar Patents Ltd.; Daniel Kligler (57) ABSTRACT

In one embodiment, a system includes a peripheral device including a hardware clock, and processing circuitry to read a given work request entry stored with a plurality of work request entries in at least one work queue in a memory, the given work request entry including timing data and an operator, the timing data being indicative of a time at which a work request should be executed, retrieve a clock value from the hardware clock, and execute the work request with a workload while execution of the work request is timed responsively to the timing data and the operator and the retrieved clock value.

24 Claims, 7 Drawing Sheets

(56) References Cited

U.S. PATENT DOCUMENTS

| | | | |
|---|---|---|---|
| 9,390,056 | B1 | 7/2016 | Noureddine et al. |
| 9,397,960 | B2 | 7/2016 | Arad et al. |
| 9,450,846 | B1 | 9/2016 | Huang et al. |
| 9,628,209 | B2 | 4/2017 | Kingsley |
| 9,667,446 | B2 | 5/2017 | Worrell |
| 10,019,333 | B2 | 7/2018 | Regev |
| 10,027,601 | B2 | 7/2018 | Narkis et al. |
| 10,075,253 | B2 | 9/2018 | Olofsson et al. |
| 10,084,559 | B1 | 9/2018 | Devineni et al. |
| 10,187,400 | B1 | 1/2019 | Castro et al. |
| 10,284,383 | B2 | 5/2019 | Bloch et al. |
| 10,320,508 | B2 | 6/2019 | Shimizu et al. |
| 10,727,966 | B1 | 7/2020 | Izenberg et al. |
| 11,271,874 | B2 | 3/2022 | Levi et al. |
| 11,831,403 | B2 | 11/2023 | Lee et al. |
| 2003/0002483 | A1 | 1/2003 | Zwack |
| 2004/0174820 | A1 | 9/2004 | Ricciulli |
| 2006/0007862 | A1 | 1/2006 | Sayeedi et al. |
| 2006/0064579 | A1* | 3/2006 | Aaron ............... H04L 63/04 713/150 |
| 2006/0095732 | A1* | 5/2006 | Tran ................... G06F 9/3826 712/E9.046 |
| 2006/0153179 | A1 | 7/2006 | Ho et al. |
| 2008/0298380 | A1 | 12/2008 | Rittmeyer et al. |
| 2012/0201248 | A1 | 8/2012 | Aoki |
| 2013/0027611 | A1 | 1/2013 | Closset |
| 2013/0173950 | A1 | 7/2013 | Banerjea et al. |
| 2014/0092918 | A1 | 4/2014 | Jost |
| 2014/0379714 | A1 | 12/2014 | Hankins |
| 2015/0046741 | A1 | 2/2015 | Yen et al. |
| 2015/0055508 | A1 | 2/2015 | Ashida et al. |
| 2015/0318015 | A1 | 11/2015 | Bose et al. |
| 2016/0127246 | A1* | 5/2016 | Ashwood-Smith ..... H04L 47/56 370/350 |
| 2017/0125026 | A1 | 5/2017 | Lawrence |
| 2017/0171362 | A1 | 6/2017 | Bolotov et al. |
| 2017/0188092 | A1 | 6/2017 | Lawrence |
| 2017/0331926 | A1 | 11/2017 | Raveh et al. |
| 2018/0124812 | A1 | 5/2018 | Thubert et al. |
| 2018/0191629 | A1 | 7/2018 | Biederman et al. |
| 2018/0309821 | A1 | 10/2018 | Byers et al. |
| 2018/0351676 | A1 | 12/2018 | Butterworth et al. |
| 2019/0056972 | A1 | 2/2019 | Zhou et al. |
| 2019/0087352 | A1 | 3/2019 | Lee et al. |
| 2019/0087652 | A1 | 3/2019 | Townsend et al. |
| 2019/0104075 | A1* | 4/2019 | Li ......................... H04L 45/20 |
| 2019/0124524 | A1 | 4/2019 | Gormley |
| 2019/0149365 | A1 | 5/2019 | Chatterjee et al. |
| 2019/0319730 | A1 | 10/2019 | Webb et al. |
| 2019/0379714 | A1* | 12/2019 | Levi ..................... H04L 47/28 |
| 2020/0026656 | A1 | 1/2020 | Liao et al. |
| 2020/0252320 | A1 | 8/2020 | Zemach et al. |
| 2020/0259759 | A1 | 8/2020 | Shalev et al. |
| 2021/0081352 | A1 | 3/2021 | Yang et al. |
| 2021/0152267 | A1 | 5/2021 | Chan et al. |
| 2021/0297151 | A1 | 9/2021 | Levi et al. |
| 2021/0409137 | A1 | 12/2021 | Mula et al. |
| 2022/0029858 | A1* | 1/2022 | Jiang ................. H04L 45/645 |
| 2022/0116132 | A1 | 4/2022 | Kasichainula et al. |
| 2022/0116473 | A1 | 4/2022 | Levi et al. |
| 2023/0262281 | A1 | 8/2023 | Kasichainula et al. |

FOREIGN PATENT DOCUMENTS

| | | |
|---|---|---|
| CN | 103354989 A | 10/2013 |
| EP | 0607412 B1 | 1/1999 |
| JP | 2005529523 A | 9/2005 |
| JP | 2007042145 A | 2/2007 |
| WO | 9418627 A2 | 8/1994 |
| WO | 9857497 A1 | 12/1998 |
| WO | 2001037489 A1 | 5/2001 |
| WO | 2010117359 A1 | 10/2010 |
| WO | 2017063322 A1 | 4/2017 |

OTHER PUBLICATIONS

Weibel et al., "Implementation and Performance of Time Stamping Techniques", 2004 Conference on IEEE 1588, pp. 1-29, Sep. 28, 2004.

InfiniBand™ Architecture Specification vol. 1, Release 1.2.1,pp. 1-1727, Nov. 2007.

Lu et al., "A Fast CRC Update Implementation", Computer Engineering Laboratory, Electrical Engineering Department, pp. 113-120, Oct. 8, 2003.

Mellette et al., "Toward Optical Switching in the Data Center", IEEE 19th International Conference on High Performance Switching and Routing (HPSR), pp. 1-6, Bucharest, Romania, Jun. 18-20, 2018.

Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.

O-RAN Alliance, "O-RAN Fronthaul Working Group; Control, User and Synchronization Plane Specification", ORAN-WG4.CUS.0-v01.00, Technical Specification, pp. 1-189, year 2019.

Vattikonda et al., "Practical TDMA for Datacenter Ethernet", EuroSys conference, Bern, Switzerland, pp. 225-238, Apr. 10-13, 2012.

Ericsson AB et al., "Common Public Radio Interface: eCPRI Interface Specification", V2.0, pp. 1-109, May 10, 2019.

Xilinx Inc., "Radio over Ethernet Framer v2.1", PB056 (v2.1), pp. 1-9, Oct. 30, 2019.

Weibel, H., "High Precision Clock Synchronization according to IEEE 1588 Implementation and Performance Issues", Zurich University of Applied Sciences, pp. 1-9, Jan. 17, 2005.

Sanchez-Palencia, J., "[RFC,v3, net-next,00/18] Time based packet transmission", pp. 1-14, Mar. 7, 2018.

IEEE Std 802.1Qaz™, "IEEE Standard for Local and metropolitan area networks-Media Access Control (MAC) Bridges and Virtual Bridged Local Area Networks-Amendment 18: Enhanced Transmission Selection for Bandwidth Sharing Between Traffic Classes", IEEE Computer Society, pp. 1-110, Sep. 30, 2011.

Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.

Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.

Wikipedia, Precision Time Protocol, pp. 1-9, Apr. 20, 2020.

SMPTE Standard, "Professional Media Over Managed IP Networks:Traffic Shaping and Delivery Timing for Video", The Society of Motion Picture and Television Engineers, pp. 1-17, Nov. 22, 2017.

Wikipedia, "Time-Sensitive Networking", pp. 1-12, Mar. 5, 2020.

IEEE Standard 1588-2002, "IEEE Standard for a Precision Clock Synchronization Protocol for Networked Measurement and Control Systems", pp. 1-154, year 2002.

Levi et al., U.S. Appl. No. 17/315,396, filed May 10, 2021.

Levi et al., U.S. Appl. No. 17/359,667, filed Jun. 28, 2021.

Mills, "Network Time Protocol (NTP)," RFC 0958, pp. 2-15, Sep. 1985.

Mills, "Network Time Protocol (Version 1): Specification and Implementation," RFC 1059, pp. 2-59, Jul. 1988.

Mills, "Internet Time Synchronization: The Network Time Protocol," IEEE Transactions on Communication, vol. 39, No. 10, pp. 1482-1493, Oct. 1991.

Mills, "Network Time Protocol (Version 3): Specification, Implementation and Analysis," RFC 1305, pp. 1-96, Mar. 1992.

Baboescu et al., "Scalable Packet Classification," Proceedings of SIGCOMM'01, ACM, pp. 199-210, year 2001.

Bader et al., "Survey and Comparison of Open Source Time Series Databases," BTW 2017, Workshopband, Lecture Notes in Informatics (LNI), Gesellschaft fuer Informatik, Bonn, pp. 249-268, year 2017.

Davie et al., "An Expedited Forwarding PHB (Per-Hop-Behavior)", RFC 3246, Network Working Group, pp. 1-32, Mar. 2002.

(56) References Cited

OTHER PUBLICATIONS

Yau et al., "Development of Situation-Aware Application Software for Ubiquitous Computing Environments," Proceedings of the 26th Annual International Computer Software and Applications Conference (COMSAC'02), IEEE Computer Society, pp. 1-6, year 2002.
U.S. Appl. No. 17/359,667 Office Action dated Jul. 5, 2022.
U.S. Appl. No. 17/973,575 Office Action dated Jul. 18, 2024.
"Time-Appliance-Project / Open-Time-Server," Spec Revision No. 1.0, GitHub, Inc., pp. 1-9, last updated Oct. 3, 2022, as downloaded from http://www.opentimeserver.com/.
Li et al., "Sundial: Fault-Tolerant Clock Synchronization for Datacenters," Proceedings of the 14th USENIX Symposium on Operating Systems Design and Implementation, Open Access, USENIX Association, pp. 1171-1186, Nov. 2020.
Chinese Notification to Grant Patent Right and Notice of Registration Formalities for application No. 202310034356.6, dated Oct. 16, 2025.

\* cited by examiner

TIME-BASED SYNCHRONIZATION DESCRIPTORS

FIELD OF THE INVENTION

The present invention relates to computer systems, and in particular, but not exclusively to, timing execution of workloads.

BACKGROUND

Various techniques for enforcing Time-Division-multiplexing (TDM) discipline in networks such as Ethernet are known in the art. For example, "Practical TDMA for Datacenter Ethernet", published by the Department of Computer Science and Engineering, University of California, San Diego, April 2012, Vattikonda et al. describes a design and implementation of a TDMA medium access control (MAC) layer for commodity Ethernet hardware that allows end hosts to dispense with TCP's reliability and congestion control.

In another example, U.S. Patent Application Publication 2019/0319730 describes techniques to operate a Time Division Multiplexing (TDM) MAC module, including examples of facilitating use of shared resources allocated to ports of a network interface based on a timeslot mechanism, wherein the shared resources are allocated to packet data received or sent through the ports of the network interface.

US Patent Publication 2021/0297151 to Levi, et al., describes a network element including one or more network ports, network time circuitry and packet processing circuitry. The network ports are configured to communicate with a communication network. The network time circuitry is configured to track a network time defined in the communication network. In some embodiments the packet processing circuitry is configured to receive a definition of one or more timeslots that are synchronized to the network time, and to send outbound packets to the communication network depending on the timeslots. In some embodiments the packet processing circuitry is configured to process inbound packets, which are received from the communication network, depending on the timeslots.

SUMMARY

There is provided in accordance with an embodiment of the present disclosure, a system including a peripheral device including a hardware clock, and processing circuitry to read a given work request entry stored with a plurality of work request entries in at least one work queue in a memory, the given work request entry including timing data and an operator, the timing data being indicative of a time at which a work request should be executed, retrieve a clock value from the hardware clock, and execute the work request with a workload while execution of the work request is timed responsively to the timing data and the operator and the retrieved clock value.

Further in accordance with an embodiment of the present disclosure, the system includes multiple host devices, each host device including an interface to connect with the peripheral device and transfer data with the peripheral device, and a processor to run at least one software application, which is configured to write host-specific work request entries of the work request entries into at least one respective work queue of the at least one work queue.

Still further in accordance with an embodiment of the present disclosure, the system includes a host device including an interface to connect with the peripheral device and transfer data with the peripheral device, and a processor to run at least one software application, which is configured to write the work request entries into the at least one work queue in the memory, wherein the peripheral device includes an interface configured to connect with the host device and transfer the data with the host device.

Additionally in accordance with an embodiment of the present disclosure the host device includes the memory.

Moreover, in accordance with an embodiment of the present disclosure the at least one software application is configured to write the timing data Coordinated Universal Time (UTC) format.

Further in accordance with an embodiment of the present disclosure the at least one software application is configured to generate respective timing data of respective ones of the work request entries for writing into the at least one work queue in the memory responsively to a time division multiplexing schedule.

Still further in accordance with an embodiment of the present disclosure, the processing circuitry is configured to process packets to be sent over the network timed the time division multiplexing schedule responsively to the respective timing data of the respective ones of the work request entries and respective clock values retrieved from the hardware clock.

Additionally in accordance with an embodiment of the present disclosure the operator is selected from any one or more of the following a conditional operator, a comparison operator, is less than, is greater than, is equal to, includes a pattern, includes a periodic pattern, is in a range, complies with a mask.

Still further in accordance with an embodiment of the present disclosure the mask includes masking out most significant bits of the retrieved clock value.

Additionally in accordance with an embodiment of the present disclosure respective timing data of respective ones of the work request entries define execution timing for work requests included in other work request entries of the work request entries.

Moreover, in accordance with an embodiment of the present disclosure the respective ones of the work request entries are fence entries without work requests.

Additionally in accordance with an embodiment of the present disclosure respective ones of the work request entries define execution timing for respective work requests included in the respective ones of the work request entries.

Still further in accordance with an embodiment of the present disclosure, at least some work request entries of the work request entries include references to locations in the memory where respective workloads are stored or should be scattered.

Further in accordance with an embodiment of the present disclosure the peripheral device includes a network interface controller and a network interface to share packets with remote devices over a packet data network.

Further in accordance with an embodiment of the present disclosure the peripheral device includes a data processing unit (DPU) including the network interface controller, the network interface, and at least processing core.

Still further in accordance with an embodiment of the present disclosure the network interface is configured to receive packets over the network, and the processing circuitry is configured to process the received packets timed responsively to respective timing data and respective operators of respective ones of the work request entries.

Additionally in accordance with an embodiment of the present disclosure the processing circuitry is configured to process packets to be sent over the network timed responsively to respective timing data and respective operators of respective ones of the work request entries, and the network interface is configured to send the packets over the network.

Further in accordance with an embodiment of the present disclosure the processing circuitry includes a clock controller to discipline the hardware clock responsively to a Precision Time Protocol (PTP).

Still further in accordance with an embodiment of the present disclosure, the processing circuitry includes a hardware accelerator to execute at least one of the work requests.

Moreover, in accordance with an embodiment of the present disclosure the hardware accelerator is configured to perform any one or more of the following encrypt the workload, decrypt workload, compute a cyclic redundancy check (CRC) of the workload, or compute a cryptographic hash of the workload.

There is also provided in accordance with another embodiment of the present disclosure a system, including a plurality of peripheral devices to connect with each other over a network, and including respective hardware clocks to be synchronized with each other over the network, and multiple host devices connected to the network via the peripheral devices, the host devices including respective processors to run respective software applications to share data with each other over the network, each of the respective software applications being configured to write into a respective work queue a respective work request entry including a respective operator and respective timing data indicative of a time at which a respective work request should be executed, wherein each of the peripheral devices includes processing circuitry to read the respective work request entry from the respective work queue, retrieve a respective clock value from a respective one of the hardware clocks, and execute the respective work request with a workload timed responsively to the respective timing data, the respective operator, and the retrieved respective clock value.

Further in accordance with an embodiment of the present disclosure the respective software applications are configured to share the data with each other over the network and generate respective work requests entries responsively to a time division multiplexing schedule.

There is also provided in accordance with still another embodiment of the present disclosure a method including reading a given work request entry stored with a plurality of work request entries in at least one work queue in a memory, the given work request entry including timing data and an operator, the timing data being indicative of a time at which a work request should be executed, retrieving a clock value from a hardware clock, and executing the work request with a workload while execution of the work request is timed responsively to the timing data and the operator and the retrieved clock value.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Communication Networks such as Enhanced Common Public Radio Interface (eCPRI), Optical Data Center Network (ODCN), video over IP (e.g., Society of Motion Picture and Television Engineers (SMPTE) 2110) and others, use Time Division Multiplex (TDM) or, sometimes, Time-Division-Multiple Access (TDMA) for communicating between endpoints, wherein a plurality of data sources share the same physical medium during different time intervals, which are referred to as timeslots. Time division multiplexing may be used in different implementations. For example, in accordance with the 5G standard different queues may be scheduled for different time periods. For example, queues 1 and 2 in time period 1, queues 3 and 4 in time period 2, etc.

TDMA multiplexing in high performance networks requires good synchronization between the end points, which is usually achieved by high precision time bases. Specialized circuitry may also be used to send and receive data in a TDM network; however, such specialized circuitry may be expensive and inflexible.

One solution is to allow a network interface controller (NIC) to process packets at specific times set by an application running on a host device. US Patent Publication 2021/0297151 to Levi, et al., previously mentioned provides such a solution. However, as the solution is based on pacing, it cannot create timestamps for any desired time and may also be heavy for the hardware to handle and may not be scalable.

Embodiments of the present invention solve at least some of the above problems by allowing timing data to be included in work request entries (stored in one or more work queues) so that a peripheral device such as a NIC, smart NIC, and/or accelerator may execute work requests according to the timing data. The work requests may include requests to process packets to be sent, process packets to be received, encrypt and/or decrypt data, compute a CRC, and/or compute a cryptographic hash.

In some embodiments, a software application running on a host device writes the work request entries with the timing data to one or more work queues, e.g., stored in the memory of the host device. The peripheral device reads the work request entries from the work queue(s) and executes the work requests according to the timing data. In some embodiments, a clock value from a local clock such as a physical clock (e.g., a Precision Time Protocol (PTP) synchronized clock) may be retrieved and compared to a time value included in the timing data to determine if the peripheral device should execute a work request. The clock value and the time value in the timing data may be in any suitable format, for example, in Coordinated Universal Time (UTC) format.

In some embodiments, operators are also written to the work request entries with the timing data describing how the timing data should be applied. For example, the operator may be "greater than" indicating that the associated work request should be executed when the time is greater than a time indicated by the timing data. The operator may include any suitable operator, for example, a conditional operator, a comparison operator, is less than, is greater than, is equal to, includes a pattern (e.g., every second for 100 microseconds), includes a periodic pattern, is in a range (e.g., between X and Y seconds), and a mask, described in more detail below.

In some embodiments, the timing values (and optionally operators) may be included in the work request entries with corresponding work requests so that for each work request entry, the timing value in that work request entry specifies a time at which the corresponding work request in that work request entry should be executed. Additionally, or alternatively, a work request entry may be a fence entry including timing data (and optionally an operator) without a corresponding work request (or with a zero-value work request). The fence entry specifies timing of execution of work requests included in other work request entries (which do not include timing data or operators). The fence entries may be useful for time divisional multiplexing in which different packets of different queues are processed in different time intervals.

In some embodiments, the operator (e.g., in a fence entry) may include a mask. The mask may be applied to the retrieved clock values. For example, if the mask specifies to mask all the most significant bits of the retrieved clock values apart from the millisecond values, then the mask may be used to identify when the millisecond values are in the range 0 to 100 so that the mask may be used to identify times during the first 100 milliseconds of every second. The above may be used in a time divisional multiplexing system in which packets of queue A are sent in the first 100 milliseconds of every second, and packets of queue B are sent in the second 100 milliseconds of every second, and so on. Queue A may include a fence entry specifying to mask the most significant bits and check the remaining bits to determine if the values are between 0 and 99. Queue B may include a fence entry specifying to mask the most significant bits and check the remaining bits to determine if the values are between 100 and 199, and so on.

In some embodiments, multiple host devices may be connected to a single peripheral device and write work request entries to one or more work queues for reading and execution by the peripheral device.

In some embodiments, multiple host devices may be connected to each other over a network via multiple peripheral devices which have clocks which are synchronized with each other (e.g., over the network). The host devices may run respective applications which communicate with each other according to a schedule such as a time division multiplexing schedule.

System Description

Figure 1:
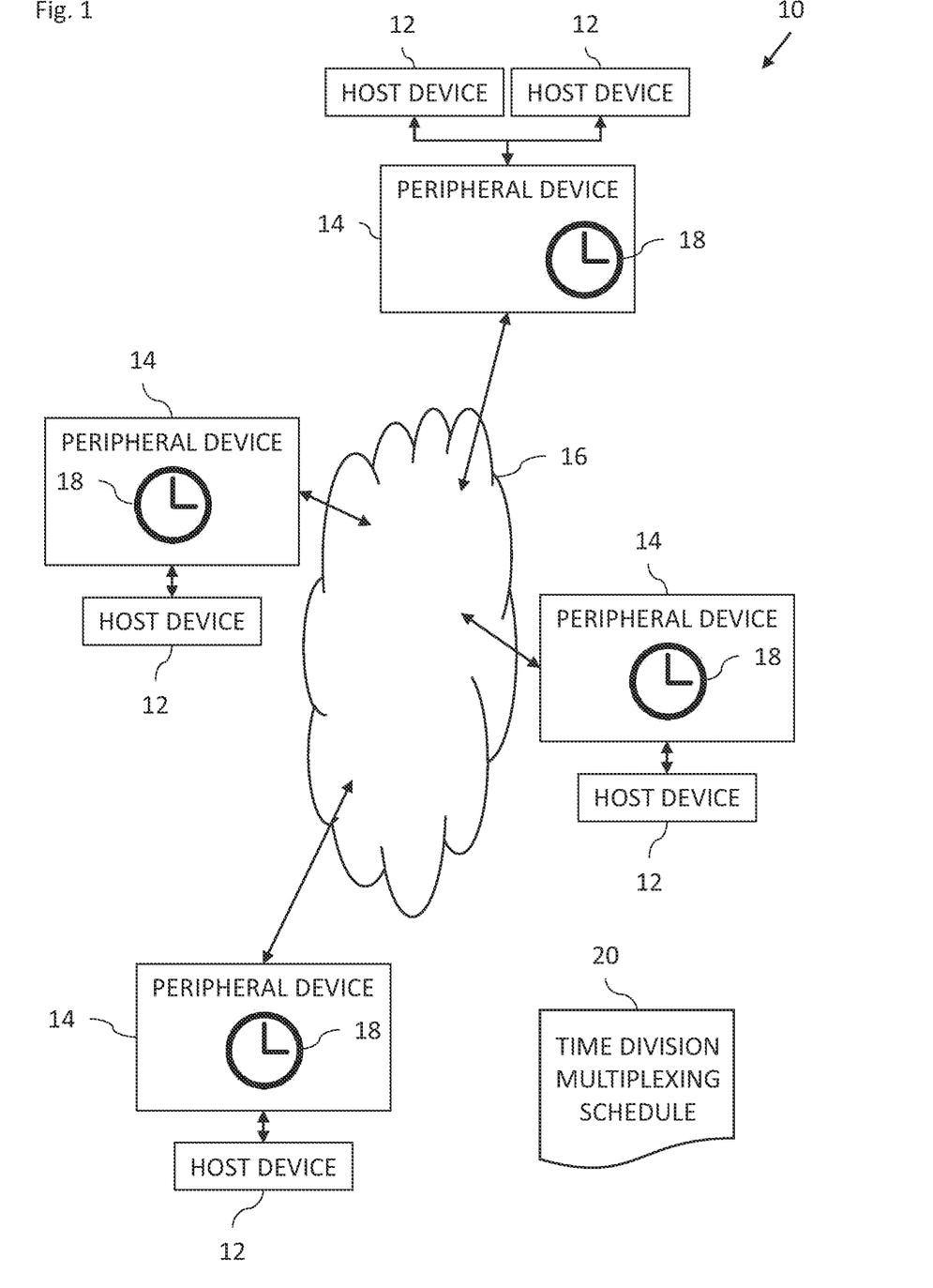
FIG. 1 is a block diagram view of a time synchronized computer system constructed and operative in accordance with an embodiment of the present invention.

Reference is now made to FIG. 1, which is a block diagram view of a time synchronized computer system 10 constructed and operative in accordance with an embodiment of the present invention. The system 10 includes multiple host devices 12, and a plurality of peripheral devices 14. The peripheral devices 14 connect with each other over a network 16. Each peripheral device 14 may include a hardware clock 18. The hardware clocks 18 of the respective peripheral devices 14 are configured to be synchronized with each other over the network 16 using a suitable time synchronization protocol such as PTP. The host devices 12 are configured to be connected to the network 16 (and each other) via the peripheral devices 14. The host devices 12 may run software applications to share data with each other over the network 16 responsively to a time division multiplexing schedule 20 (FIG. 1) described in more detail below.

Figure 2:
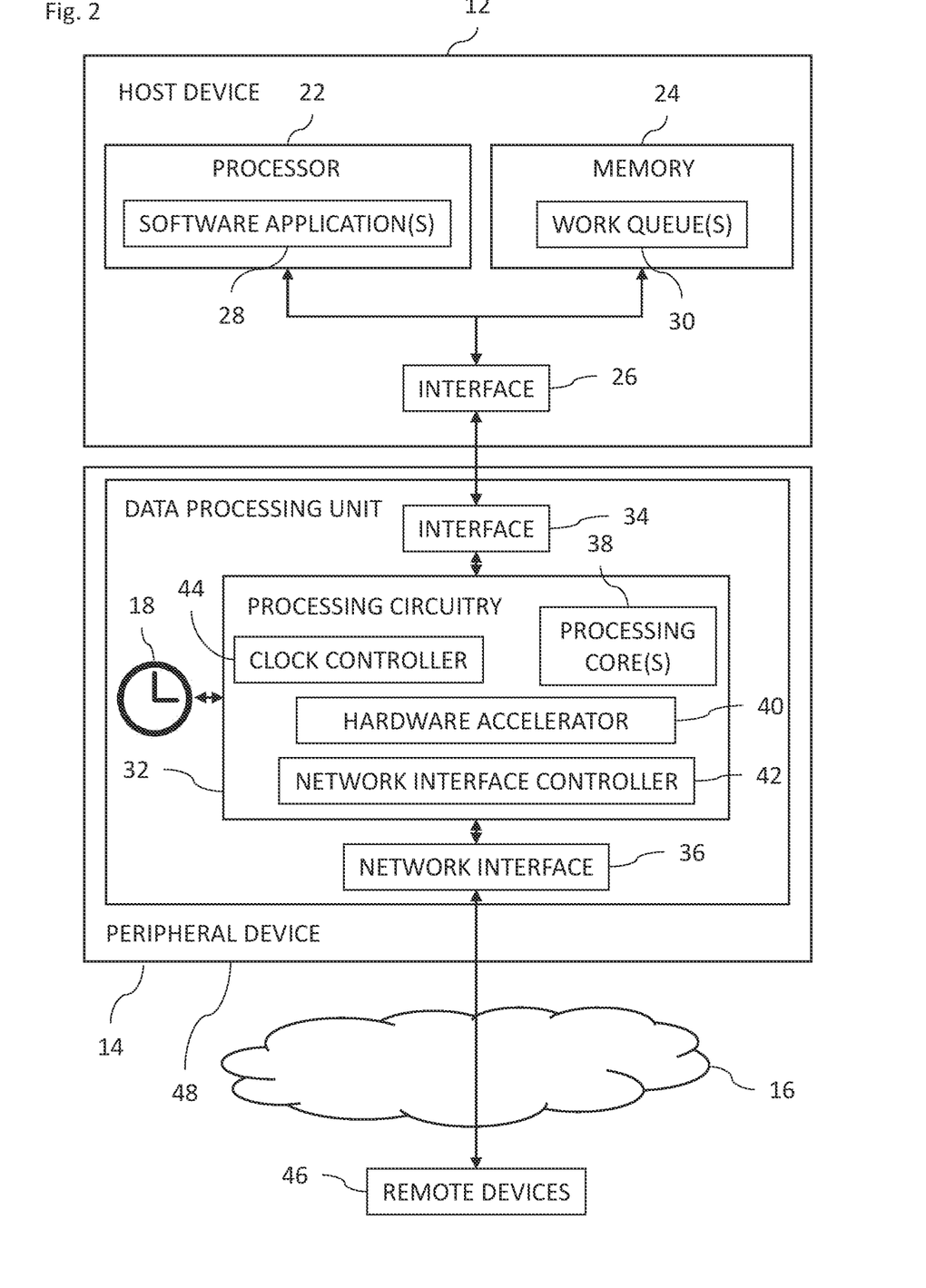
FIG. 2 is a block diagram view of a host device and peripheral device in the system of FIG. 1.

Reference is now made to FIG. 2, which is a block diagram view of one of the host devices 12 and a corresponding peripheral device 14 in the system 10 of FIG. 1. The host devices 12 includes a processor 22, a memory 24, and an interface 26. The interface 26 (for example, a peripheral bus interface) is configured to connect with the peripheral device 14 and transfer data with the peripheral device 14. The processor 22 is configured to run at least one software application 28, which is configured to write (host-specific) work request entries into at least one respective work queue 30 in the memory 24.

The peripheral device 14 includes processing circuitry 32, an interface 34, the hardware clock 18, and a network interface 36. The interface 34 (for example, a peripheral bus interface) is configured to connect with the host device 12 and transfer the data with the host device 12. The network interface 36 is configured to share packets with remote devices 46 over a packet data network (e.g., the network 16). The network interface 36 is configured to receive packets over the network 16 and send packets over the network 16. The processing circuitry 32 may include one or more processing cores 38, a hardware accelerator 40, a network interface controller (NIC) 42, and a clock controller 44. The hardware accelerator 40 is configured to execute work requests, described in more detail with reference to FIG. 8. The network interface controller 42 may include a physical layer (PHY) chip and a MAC chip (not shown) to process received packets, and packets for sending over the network 16. The clock controller 44 is configured to discipline the hardware clock 18 responsively to a clock synchronization protocol such as PTP. The functions of the processing circuitry 32 are described in more detail with reference to FIG. 8. In some embodiment, the peripheral device 14 includes a data processing unit 48 (DPU) (e.g., a smart NIC), which includes the processing circuitry 32, the interface 34, the network interface 36, and the hardware clock 18.

In practice, some or all of these functions of the processing circuitry 32 may be combined in a single physical component or, alternatively, implemented using multiple physical components. These physical components may comprise hard-wired or programmable devices, or a combination of the two. In some embodiments, at least some of the functions of the processing circuitry 32 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
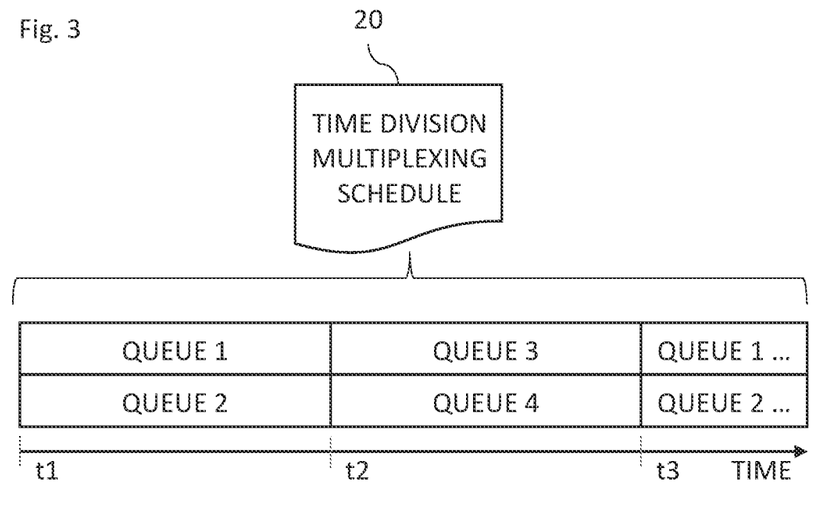
FIG. 3 is a schematic view of an illustration of a time division multiplexing schedule for use in the system of FIG. 1.

Reference is now made to FIG. 3, which is a schematic view of an illustration of the time division multiplexing schedule 20 for use in the system 10 of FIG. 1. FIG. 3 shows that packets of queues 1 and 2 are transmitted in time period t1 and t3, and so on (i.e., the odd time periods), whereas packets of queues 3 and 4 are transmitted in time period 2, and so on (i.e., the even time periods).

Figure 4:
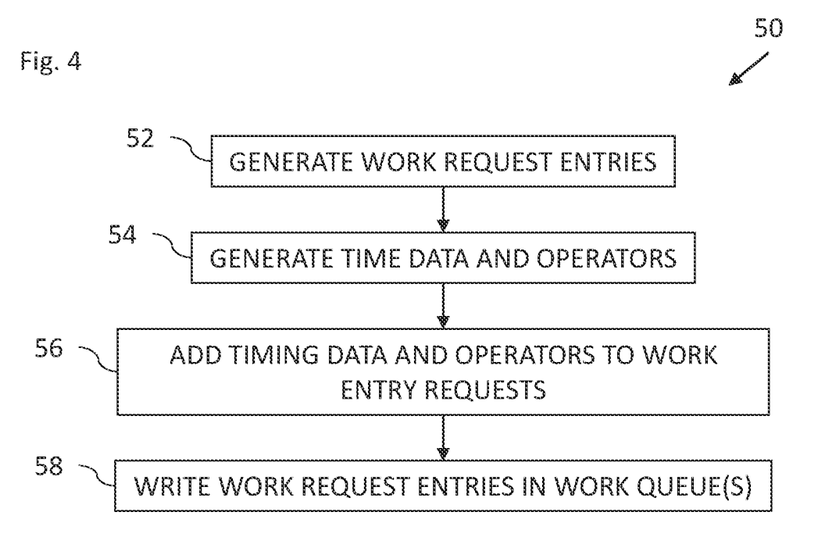
FIG. 4 is a flowchart including steps in a method of operation of the host device of FIG. 2.

Reference is now made to FIG. 4, which is a flowchart 50 including steps in a method of operation of the host device 12 of FIG. 2.

The software application(s) 28 running on the processor 22 of the host device 12 is configured to generate work request entries (block 52), and timing data and operators (block 54). The timing data may use any suitable time format. In some embodiments, the software application(s) 28 is configured to write the timing data according to UTC format. The software application(s) 28 is configured to add the timing data and operators to at least some of the work request entries (block 56). For example, the timing data and a corresponding operator may be added to each work request entry or only some of the work request entries (e.g., fence entries), described in more detail with reference to FIG. 5. The software application(s) 28 is configured to write the work request entries into the work queue(s) 30 in the memory 24 (block 58).

The work requests entries may be written to different work queue(s) 30 according to the time division multiplexing schedule 20. For example, FIG. 3 illustrates how different queues may facilitate time division multiplexing of packets or any suitable workload. In some embodiments, the software application(s) 28 is configured to generate respective timing data of respective work request entries for writing into the work queue(s) 30 responsively to the time division multiplexing schedule 20.

The operator may be selected from any suitable operator, for example, from one or more of the following: a conditional operator; a comparison operator; is less than; is greater than; is equal to; includes a pattern; includes a periodic pattern; is in a range; complies with a mask. The mask may include masking out most significant bits (and optionally some least significant bits) of a retrieved clock value as described in more detail with reference to FIG. 9.

In some embodiments, the software application(s) 28 sends a "doorbell" (e.g., writing to a specific memory location) to the peripheral device 14, notifying the peripheral device 14 that there is work to execute on the work queue(s) 30. The peripheral device 14 then reads entries in the work queue(s) 30 in response to the doorbell and executes the work according to the timing data and operators as described in more detail with reference to FIG. 8.

Therefore, in the context of the multiple host devices 12 of FIG. 1, each host device 12 may include a respective processor 22 to run respective software applications 28 (i.e., each processor 22 of each host device 12 runs one of the software applications 28) to share data with each other over the network 16. Tn some embodiments, the respective software applications 28 are configured to share the data with each other over the network 16 and generate respective work requests entries responsively to the time division multiplexing schedule 20 (FIG. 1).

In a multi-host environment as shown in FIG. 1, each respective software application 28 (run by respective processors 22 of respective host devices 12) is configured to write into respective work queue(s) 30 respective work request entries including respective operators and respective timing data indicative of respective times at which respective work requests should be executed. In the multi-host environment, each peripheral device 14 is configured to: read a work request entry (including respective timing data, and a respective operator) from the respective work queue 30 (i.e., the work queue(s) 30 written for that peripheral device 14); retrieve a respective clock value from a respective one of the hardware clocks 18 (i.e., from the hardware clock 18 of that peripheral device 14); and execute a respective work request (i.e., a work request included in the read work request entry or a work request in another work request entry whose execution is times by the read work request entry) with a workload timed responsively to the respective timing data, the respective operator, and the retrieved respective clock value, as described in more detail with reference to FIG. 8.

Figure 5:
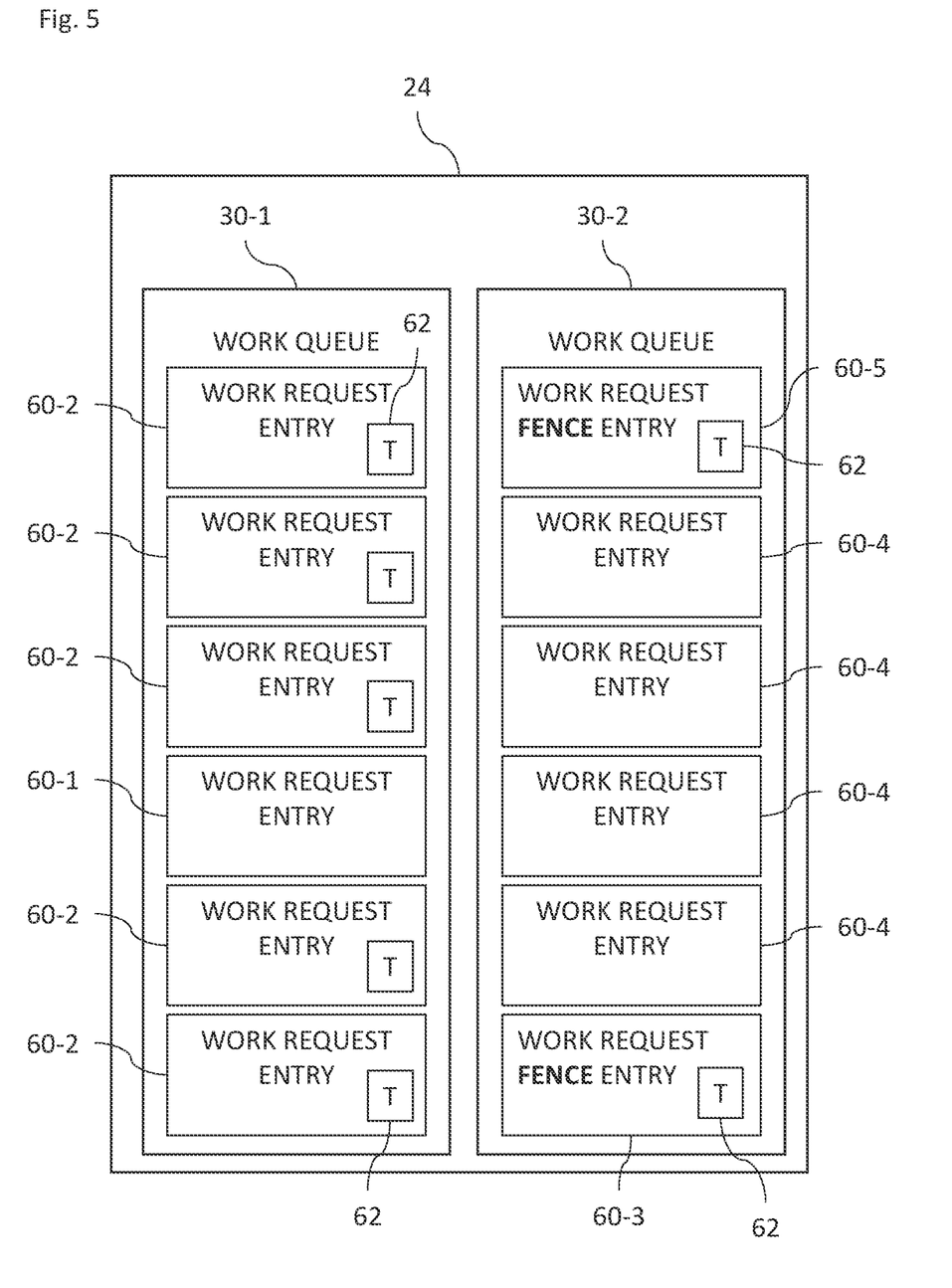
FIG. 5 is a schematic view of work queues for use in the system of FIG. 1.

Reference is now made to FIG. 5, which is a schematic view of work queues 30 for use in the system 10 of FIG. 1.

FIG. 5 shows two work queues 30, a work queue 30-1 and a work queue 30-2. Work queue 30-1 include multiple work request entries 60 including work request entries 60-2 that include timing data 62, and a work request entry 60-1 without timing data. The work request entries 60-2 define execution timing for respective work requests included the respective work request entries 60-2. In other words, each work request entry 60-2 includes the timing data 62 which defines execution for a work request included in that work request entry 60-2. The work request entry 60-1 which does not include timing data is generally executed once read from the work queue 30-1 without being subject to an execution time limitation.

The work queue 30-2 includes work request entries 60-4 with timing data and a work request entry 60-3, which is a fence entry with timing data 62 defining execution timing of all the work request entries 60-4 shown in the work queue 30-2. The work request entries 60-4 include respective work requests. The work request entry 60-3 is a fence entry with timing data 62 but without a work request. The work queue 30-2 also includes a work request entry 60-5 which is a fence entry with timing data 62 defining execution timing of other work request entries 60 in the work queue 30-2 but not shown in FIG. 5. Therefore, the respective timing data 62 of respective fence entries 60-3, 60-5 define execution timing for work requests included in other work request entries 60.

Figure 6:
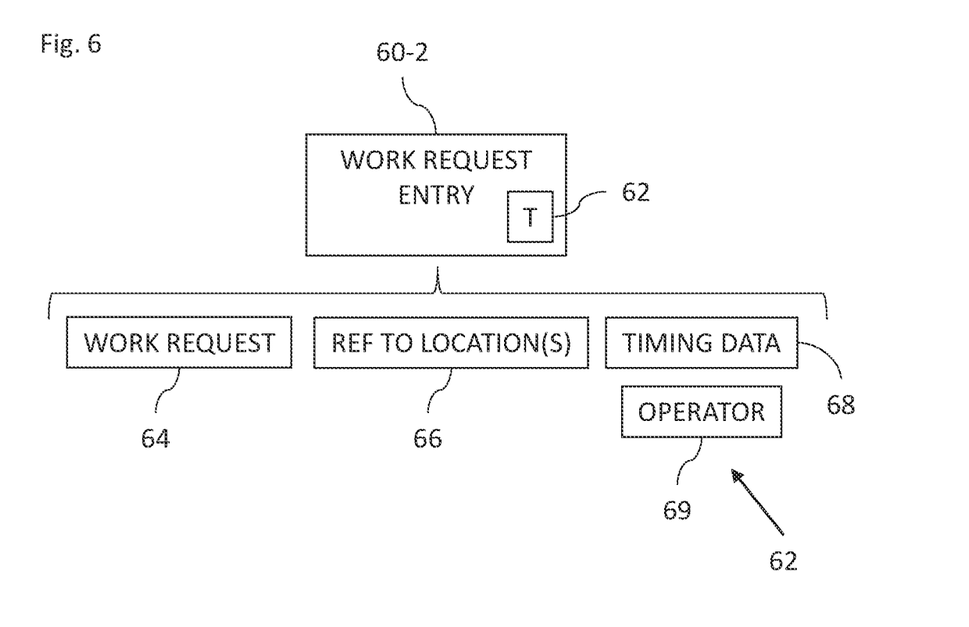
FIG. 6 is a schematic view of a work request entry for use in the system of FIG. 1.

Reference is now made to FIG. 6, which is a schematic view of one of the work request entries 60-2 for use in the system 10 of FIG. 1. The work request entry 60 includes a work request 64 (describing the work to be performed), a reference 66 to one or more locations in the memory 24 where the respective workload (i.e., the workload to be worked on according to the work request) is stored or should be scattered, timing data 62 (which includes timing data 68 and an operator 69). The work to be performed may include any suitable request for example, to process a packet for sending over the network 16, to process a packet received over the network 16, to encrypt or decrypt data, to compute a CRC, to compute a cryptograph hash. The timing data 68 may include one or more times. For example, if the operator 69 specifies a range, then the timing data 68 may include two times to define the range. For example, if the operator 69 specifies a pattern, then the timing data 68 may include two times to define the pattern, such as every second for the first 100 microseconds. In many cases, the timing data 68 includes a single time. The operator 69 may include any suitable operator, for example, a conditional operator, a comparison operator, is less than, is greater than, is equal to, includes a pattern (e.g., every second for the first 100 microseconds), includes a periodic pattern, is in a range (e.g., between X and Y seconds), and a mask, described in more detail below.

Figure 7:
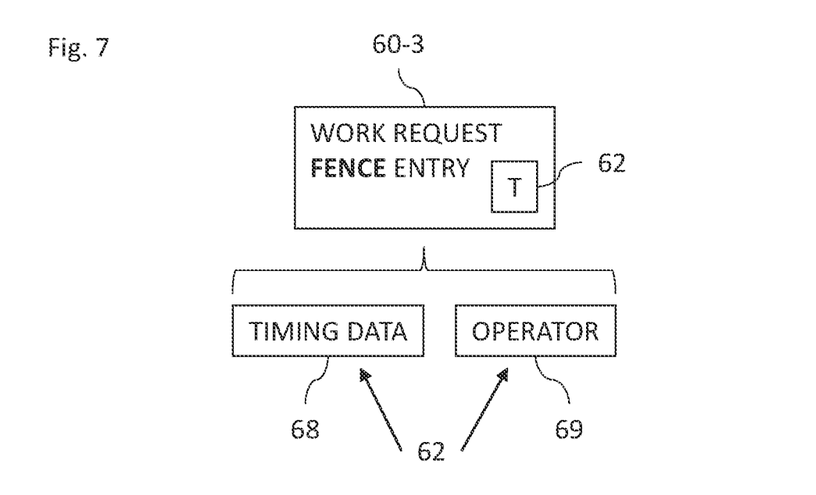
FIG. 7 is a schematic view of a work request fence entry for use in the system of FIG. 1.

Reference is now made to FIG. 7, which is a schematic view of a work request fence entry 60-3 for use in the system 10 of FIG. 1. The work request entry 60-3 includes timing data 68 and the operator 69 but does not include the work request 64 or reference 66. In some embodiments, the work request entry 60-3 may include a zero-value work request, i.e., a work request with no work to execute.

Figure 8:
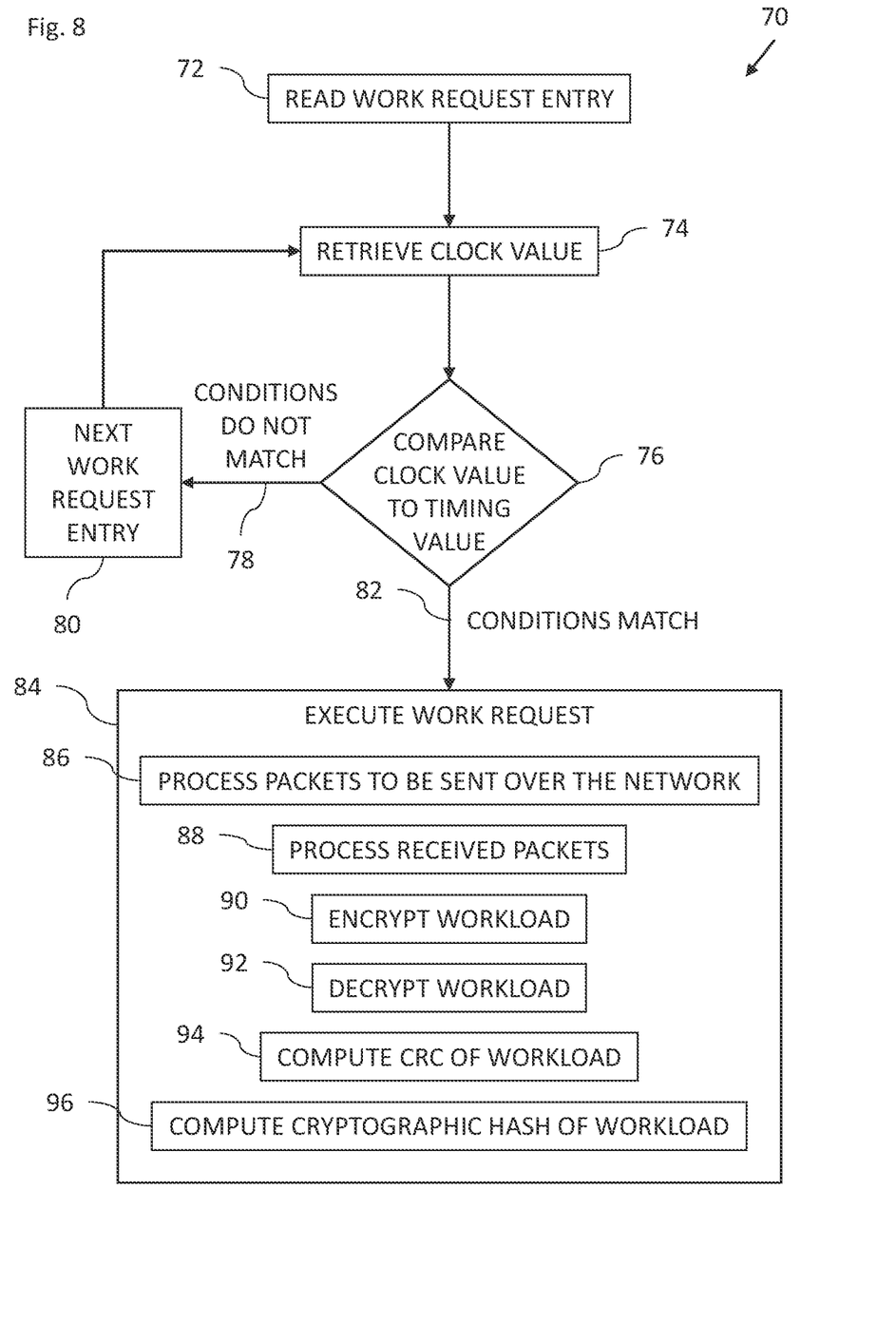
FIG. 8 is a flowchart including steps in a method of operation of the peripheral device of FIG. 2.

Reference is now made to FIG. 8, which is a flowchart 70 including steps in a method of operation of the peripheral device 14 of FIG. 2.

The processing circuitry 32 is configured to read a given work request entry 60 stored with a plurality of work request entries 60 in the work queue(s) 30 in the memory 24 (block 72). The given work request entry 60 may include timing data 68 and operator 69. The timing data 68 is indicative of a time at which at least one work request should be executed. The processing circuitry 32 is configured to retrieve a clock value from the hardware clock 18 (block 74). In some embodiments, the processing circuitry 32 may include a scheduler (not shown) which is configured to copy the work queue(s) 30 from the memory 24 and pass control to an execution engine (not shown) of the processing circuitry 32 that reads the given work request entry 60 and performs the steps described below with reference to FIG. 8.

At a decision block 76, the processing circuitry 32 is configured to compare the timing data 68 included in the given work request entry 60 with the retrieved clock value based on the operator 69 included in the given work request entry 60. If the conditions specified by the timing data 68 and the operator 69 do not match the retrieved clock value (branch 78), the given work request is returned to the queue 30 (or returned to the scheduler) and the next work request entry 60 is read from the queue 30 (block 80) and the steps of blocks 74 and 76 are repeated with the next work request entry 60. For example, if the operator 69 is "greater than" and the timing data 68 is equal to 3, but the current retrieved clock value is 2, then the conditions do not match. If the conditions do match (branch 82) processing continues with the step of block 84. For example, if the operator 69 is "greater than" and the timing data 68 is equal to 3, and the current retrieved clock value is 4, then the conditions do match. In some embodiments, the work request entries 60 may be sorted by time of execution. The processing of operator 69 including a mask is described in more detail with reference to FIG. 9.

The processing circuitry 32 is configured to execute the work request(s) associated with the given work request entry 60 with the workload(s) associated with the work request(s) while execution of the work request(s) is timed responsively to the timing data 68 and the operator 69 (included in the given work request entry) and the retrieved clock value (block 84). In some embodiments, the work request 64 and the reference 66 is included in the given work request entry 60. In some embodiments, the given work request entry 60 is a fence entry, which does not include the work request 64 and the reference 66 but provides timing data 62 for other work request entries 60 in the work queue(s) 30 as described above.

The execution of the work request(s) may comprise any suitable processing request. Some examples are described with reference to steps of block 86-96 described below.

The processing circuitry 32 may be configured to process packets to be sent over the network 16 timed responsively to respective timing data 68 and respective operators 69 of respective ones of the work request entries 60 (block 86). The network interface 36 is configured to send the packets over the network 16.

The processing circuitry 32 may be configured to process packets to be sent over the network 16 timed according to the time division multiplexing schedule 20 (FIG. 1) responsively to the respective timing data 68 of the respective work request entries 60 and respective clock values retrieved from the hardware clock 18.

In some embodiments, the network interface 36 is configured to receive packets over the network 16, and the processing circuitry 32 is configured to process the received packets timed responsively to respective timing data 68 and respective operators 69 of respective work request entries 60 (block 88). For example, when packets are received, the packets enter a packet processing pipeline of the processing circuitry 32. The pipeline may include a steering decision process. The result of the steering decision process may include which work request entry a packet belongs to. If the result to the steering decision process is work request entry number 5, for example, the processing circuitry 32 reads work request entry number 5. If the timing data 68 and operator 69 of the read work request dictate that the packet should not be processed until 9:00 and the time now is 8:59, the packet may be dropped.

In some embodiments, the hardware accelerator 40 is configured to perform any one or more of the following: encrypt the workload (block 90); decrypt workload (block 92); compute a cyclic redundancy check (CRC) of the workload (block 94); or compute a cryptographic hash of the workload (block 96).

Figure 9:
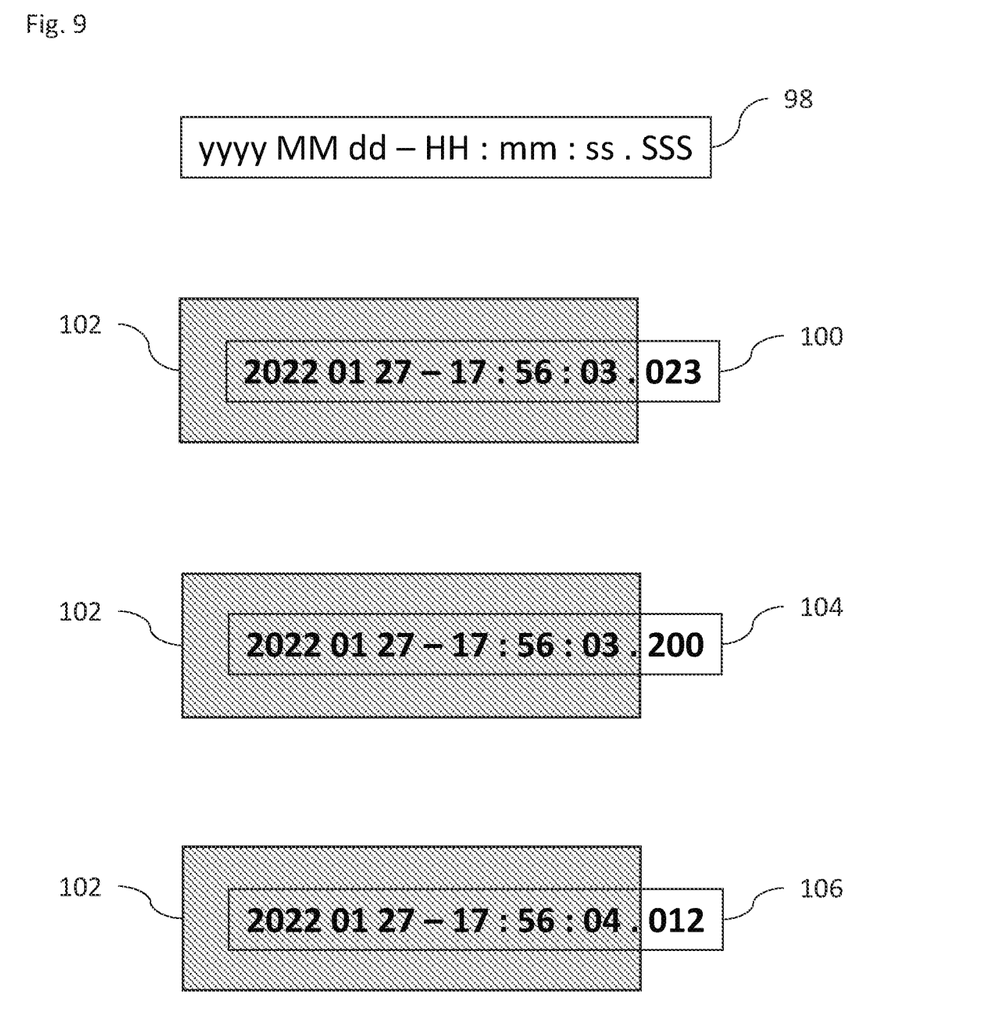
FIG. 9 is a schematic view of clock value masking for use in the system of FIG. 1.

Reference is now made to FIG. 9, which is a schematic view of clock value masking for use in the system 10 of FIG. 1. Block 98 shows a UTC time format including year (yyyy), month (MM), day (dd), hour (HH), minute (mm), seconds (ss), and milliseconds (SSS). If workloads (e.g., packets) in one of the work queues 30 should be processed for the first 100 milliseconds of every second, for example, then a mask could be employed as the operator 69 specifying the bits of a retrieved clock value that should be masked.

FIG. 9 shows three different time values 100, 104, 106 in which the most significant bits (year, month, day, hour, minute and second) of the clock values 100, 104, 106 are masked using a mask 102 leaving the millisecond values (SSS) of the clock values 100, 104, 106. Therefore, the millisecond values (SSS) of the masked clock values 100, 104, 106 can be compared to the timing data 68 to determine if the clock values 100, 104, 106 indicate the first 100 milliseconds of a second thereby revealing that clock values 100, 106 complying with that condition. In some embodiments, the mask could also mask some of the least significant bits (SS) just leaving one of the digits (the most significant bit, S) of the milliseconds (SSS) so if the digit is equal to 0 then it is known that the clock value is in the first 100 milliseconds of a second.

The above may be used in a time divisional multiplexing system in which packets of queue A are sent in the first 100 milliseconds of every second, and packets of queue B are sent in the second 100 milliseconds of every second, and so on. Queue A may include a fence entry specifying to mask the most significant bits and check the remaining bits to determine if the values are between 0 and 99. Queue B may include a fence entry specifying to mask the most significant bits and check the remaining bits to determine if the values are between 100 and 199, and so on.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A peripheral device, comprising:
a hardware clock; and
processing circuitry to:
read a given work request entry stored with a plurality of work request entries in at least one work queue in a memory, respective ones of the work request entries being fence entries without work requests, the fence entries including timing data that defines execution timing for other work requests, the given work request entry including timing data and an operator, the timing data being indicative of a time at which a work request should be executed;
retrieve a clock value from the hardware clock; and
execute the work request with a workload while execution of the work request is timed responsively to the timing data and the operator and the retrieved clock value, wherein:
the operator defines a condition for executing the work request based on the timing data and retrieved clock value; and
the processing circuitry includes a packet processing pipeline to perform a steering decision process based on packets associated with the work request entries.

2. A system comprising the peripheral device according to claim 1, and further comprising multiple host devices, each host device including:
an interface to connect with the peripheral device and transfer data with the peripheral device; and
a processor to run at least one software application, which is configured to write host-specific work request entries of the work request entries into at least one respective work queue of the at least one work queue.

3. A system comprising the peripheral device according to claim 1, and further comprising a host device including:
an interface to connect with the peripheral device and transfer data with the peripheral device; and
a processor to run at least one software application, which is configured to write the work request entries into the at least one work queue in the memory, wherein the peripheral device includes an interface configured to connect with the host device and transfer the data with the host device.

4. The system according to claim 3, wherein the host device includes the memory.

5. The system according to claim 3, wherein the at least one software application is configured to write the timing data according to Coordinated Universal Time (UTC) format.

6. The system according to claim 3, wherein the at least one software application is configured to generate respective timing data of respective ones of the work request entries for writing into the at least one work queue in the memory responsively to a time division multiplexing schedule.

7. The system according to claim 6, wherein the processing circuitry is configured to process packets to be sent over the network timed according to the time division multiplexing schedule responsively to the respective timing data of the respective ones of the work request entries and respective clock values retrieved from the hardware clock.

8. The device according to claim 1, wherein the operator is selected from any one or more of the following: a conditional operator; a comparison operator; is less than; is greater than; includes a pattern; includes a periodic pattern; or is in a range.

9. The device according to claim 1, wherein the operator includes a mask, which masks out most significant bits of the retrieved clock value.

10. The device according to claim 1, wherein respective ones of the work request entries define execution timing for respective work requests included in the respective ones of the work request entries.

11. The device according to claim 1, wherein at least some work request entries of the work request entries include references to locations in the memory where respective workloads are stored or should be scattered.

12. The device according to claim 1, further comprising a network interface controller and a network interface to share packets with remote devices over a packet data network.

13. The device according to claim 12, further comprising a data processing unit (DPU) comprising the network interface controller, the network interface, and at least one processing core.

14. The device according to claim 12, wherein:
the network interface is configured to receive packets over the network; and
the processing circuitry is configured to process the received packets timed responsively to respective timing data and respective operators of respective ones of the work request entries.

15. The system according to claim 12, wherein:
the processing circuitry is configured to process packets to be sent over the network timed responsively to respective timing data and respective operators of respective ones of the work request entries; and
the network interface is configured to send the packets over the network.

16. The system according to claim 1, wherein the processing circuitry comprises a clock controller to discipline the hardware clock responsively to a Precision Time Protocol (PTP).

17. The system according to claim 1, wherein the processing circuitry comprises a hardware accelerator to execute at least one of the work requests.

18. The system according to claim 17, wherein the hardware accelerator is configured to perform any one or more of the following:
encrypt the workload;
decrypt the workload;
compute a cyclic redundancy check (CRC) of the workload; or
compute a cryptographic hash of the workload.

19. A system, comprising:
a plurality of peripheral devices to connect with each other over a network, and comprising respective hardware clocks to be synchronized with each other over the network; and
multiple host devices connected to the network via the peripheral devices, the host devices comprising respective processors to run respective software applications to share data with each other over the network, each of the respective software applications being configured to write into a respective work queue a plurality of work request entries including a respective work request entry including a respective operator and respective timing data indicative of a time at which a respective work request should be executed respective ones of the work request entries being fence entries without work requests, the fence entries including timing data that defines execution timing for other work requests, wherein each of the peripheral devices comprises processing circuitry to:

read the respective work request entry from the respective work queue;

retrieve a respective clock value from a respective one of the hardware clocks; and execute the respective work request with a workload timed responsively to the respective timing data, the respective operator, and the retrieved respective clock value wherein the respective operator defines a condition for executing the respective work request based on the respective timing data and respective retrieved clock value, wherein the processing circuitry of each of the peripheral devices includes a packet processing pipeline to perform a steering decision process based on a packet associated with the respective work request entry.

20. The system according to claim 19, wherein the respective software applications are configured to share the data with each other over the network and generate respective work requests entries responsively to a time division multiplexing schedule.

21. A method comprising:

reading a given work request entry stored with a plurality of work request entries in at least one work queue in a memory, respective ones of the work request entries being fence entries without work requests, the fence entries including timing data that defines execution timing for other work requests, the given work request entry including timing data and an operator, the timing data being indicative of a time at which a work request should be executed;

retrieving a clock value from a hardware clock;

executing the work request with a workload while execution of the work request is timed responsively to the timing data and the operator and the retrieved clock value wherein the operator defines a condition for executing the work request based on the timing data and retrieved clock value; and performing a steering decision process with a packet processing pipeline based on packets associated with the work request entries.

22. The peripheral device according to claim 1, wherein the packet processing pipeline is to perform the steering decision process based on the packets yielding results indicating which of the work request entries the packets belong to.

23. The peripheral device according to claim 22, further comprising a network interface controller including a physical layer and a medium access control (MAC) chip and to process the packets which are received, or for sending, over a network.

24. The peripheral device according to claim 23, further comprising a clock controller to discipline the hardware clock responsively to a clock synchronization protocol.

* * * * *